M. KESSLER.
DOUBLE SHOE EXPANSION CLUTCH.
APPLICATION FILED SEPT. 12, 1910.
998,694.
Patented July 25, 1911.
2 SHEETS—SHEET 1.
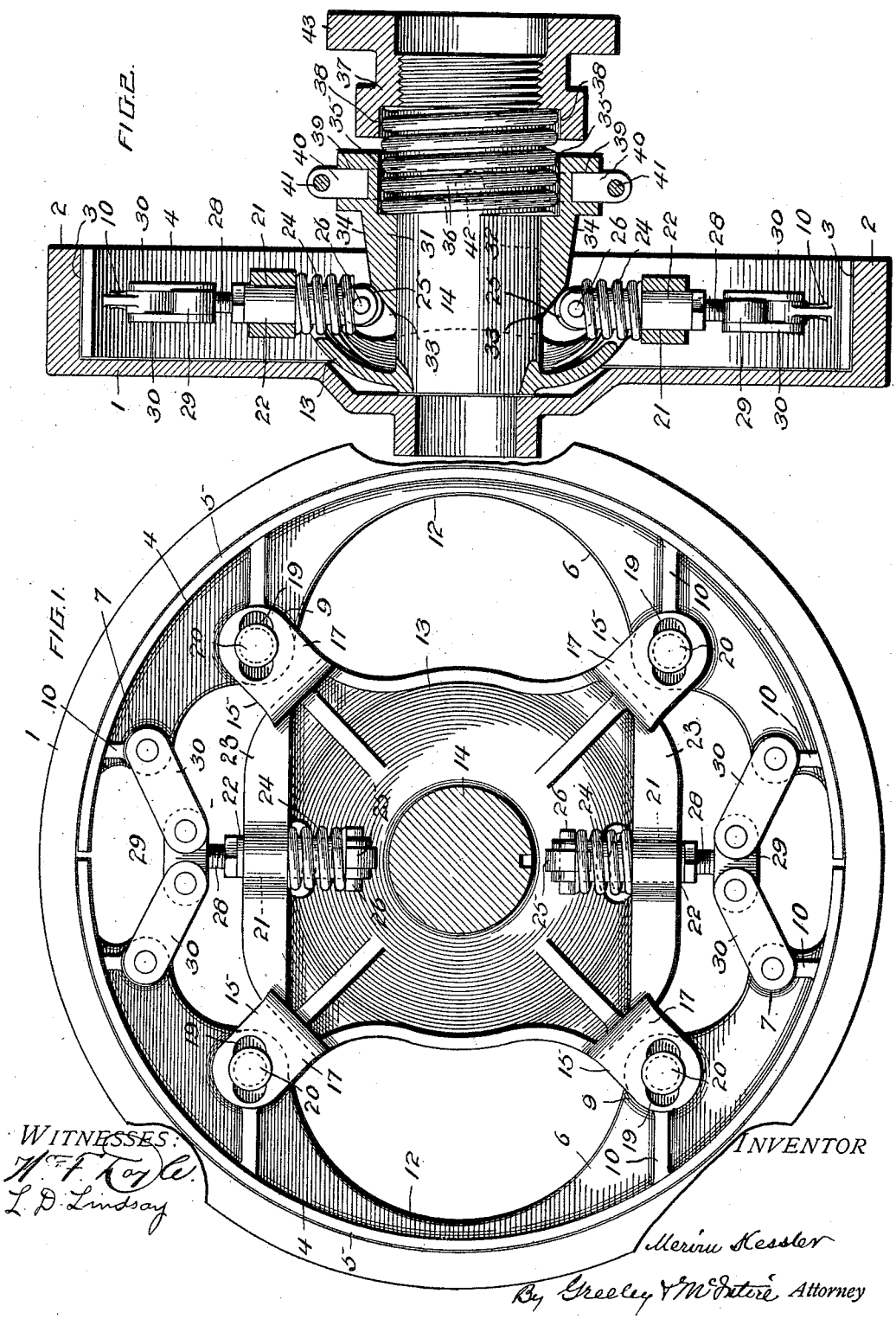

M. KESSLER.
DOUBLE SHOE EXPANSION CLUTCH.
APPLICATION FILED SEPT. 12, 1910.
998,694.
Patented July 25, 1911.
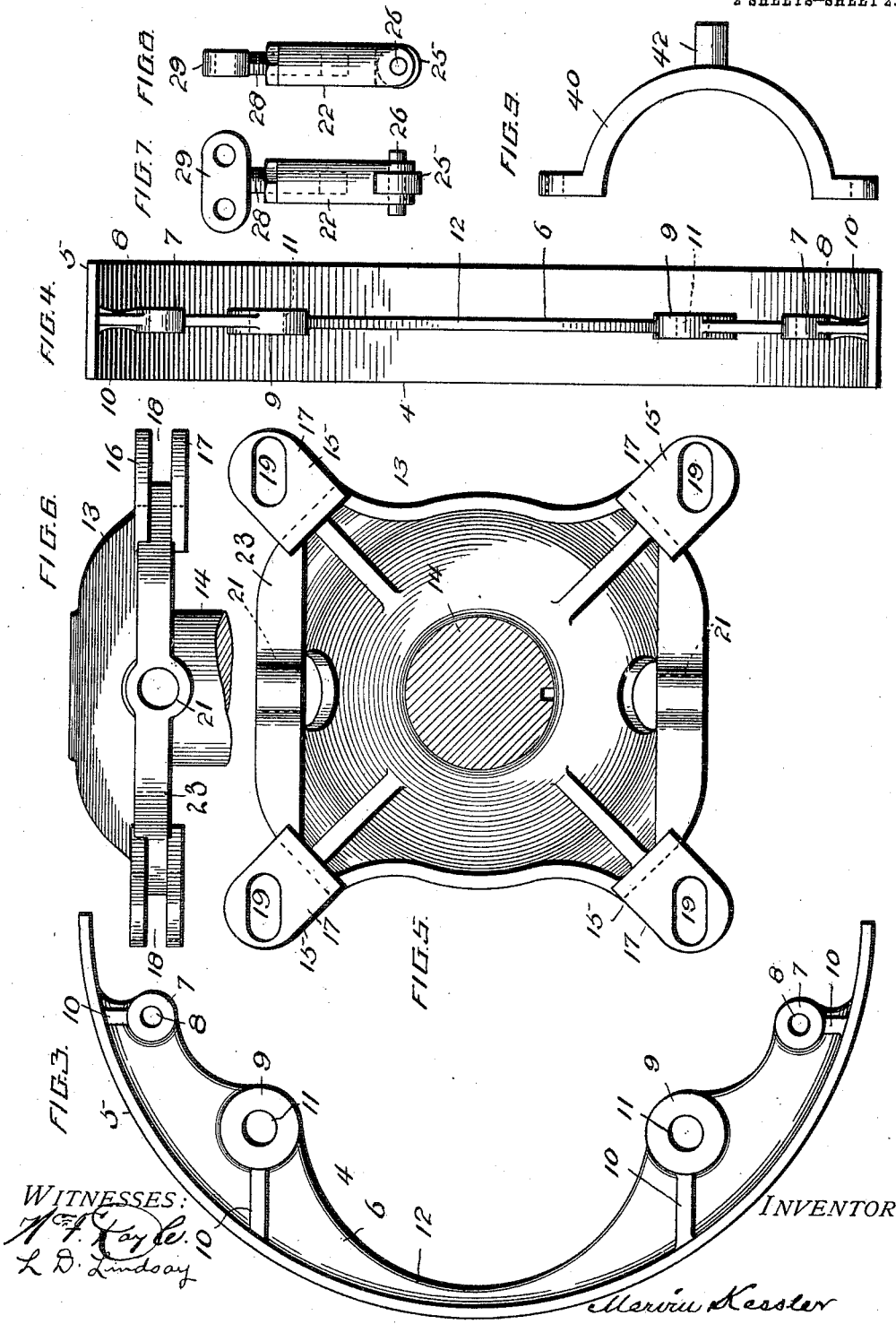

UNITED STATES PATENT OFFICE.

MERVIN KESSLER, OF PERU, INDIANA, ASSIGNOR OF ONE-THIRD TO CHARLES S. DUNN AND ONE-THIRD TO RAY ADAMS, BOTH OF PERU, INDIANA.

DOUBLE-SHOE EXPANSION-CLUTCH.

998,694. Specification of Letters Patent. Patented July 25, 1911.

Application filed September 12, 1910. Serial No. 581,558.

*To all whom it may concern:*

Be it known that I, MERVIN KESSLER, a citizen of the United States, residing at Peru, in the county of Miami and State of Indiana, have invented certain new and useful Improvements in Double-Shoe Expansion-Clutches; and I do hereby declare the following to be a full, clear, and exact description of the invention, such as will enable others skilled in the art to which it appertains to make and use the same.

My invention relates to friction clutches of the class in which radially movable shoes on one clutch member are caused to engage the inner face of a flange on the other clutch member, and my invention has for its object to provide a clutch of this class which shall be simple in construction, in which the moving parts shall all be carried by a single element, in which the shoes will be firmly held against the flange of the driven member when the clutch is in operative position and in which centrifugal force of the driving member will not cause the shoes to bear against the flange of the driven member when unclutched.

With these and other objects as hereinafter explained in view, my invention consists in the construction and combination of elements hereinafter described and particularly pointed out in the claims.

Referring to the drawings:—Figure 1 is an elevation of the clutch, the shaft of the spider being shown in section, the parts carried by the shaft being removed. Fig. 2 is a vertical section on the plane of the axis of the spider shaft. Fig. 3 is a detail elevation of one of the shoes. Fig. 4 is an edge view of the shoe shown in Fig. 3. Fig. 5 is an elevation of the spider, the spider shaft being shown in section. Fig. 6 is an edge view of the spider shown in Fig. 5. Figs. 7 and 8 are front and side views of the plungers by which the shoes are operated and Fig. 9 is a side view of one half of the release collar.

In the drawing—1 is the outer or driven member of the clutch consisting of a wheel or gear carried by the shaft to be driven and having a flange 2. The inner surface 3 of this flange is cylindrical and forms the bearing surface for the friction shoes 4 of the driving member of the clutch. These friction shoes have their outer surfaces 5 formed on an arc of a circle of substantially the same diameter as that on which the inner surface 3 of the driven member 1 is formed, the length of the arc being slightly less than a semi-circumference. On their inner side the shoes are each provided with a web 6 having near its ends bosses 7 which are perforated at 8, and also having at points farther from the ends larger bosses 9, connected to the rim of the shoe by strengthening braces 10. The bosses 9 are perforated at 11. Between the bosses 9 the web 6 is cut away nearly to the rim as indicated at 12.

The shoes 4 are carried by a spider 13 which is formed on the end of a short shaft 14 which is connected with the shaft (not shown) of the engine or other power device as hereinafter explained. The spider with its shaft 14 supports and carries all of parts of the driving member. The spider 13 is provided with arms 15 arranged in pairs. These arms are forked at their ends to form inner and outer flat fingers 16 and 17, having between them a recess 18 adapted to receive the boss 9 and the fingers are provided with openings or slots 19 adapted to receive the ends of a pin 20 which is secured in the opening 11 of the boss. The openings or slots 19 are of a greater length than the diameter of the pin 20 in a direction parallel with a line joining the middle points of the arcs on which the outer surfaces 5 of the shoes are formed, so as to permit the shoes to be movable toward and from the center of the spider on this line which is coincident with the line of a diameter of the shaft 14. The shoes are by this arrangement so connected with the spider as to always rotate with it and at the same time to be free to move in and out sufficiently to engage and be disengaged from the inner surface 3 of the driven member 1.

At diametrically opposite points on a line at right angles to the line joining the middle points of the arcs on which the outer surfaces of the shoes are formed the spider 13 is provided with radial sockets 21 formed in a thickened portion 23 of the rim of the spider. At their lower ends the plungers are each forked to receive a roller 25, journaled on a pin 26 the ends of which project beyond the surface on each side. A coiled spring 24 bears at one end against the inner face of the thickened portion 23 and at its other end bears against the ends of the pin 26, thus pressing the plunger inward toward the axis of the spider shaft 14. Into the outer end of the plunger 22 is screwed a pin 28 carrying on its outer end a cross head 29 to the ends of which are pivoted links 30, the free ends of which engage pins extending through the perforations 8 of the bosses 7 on the web 6 of the shoes 4, the construction being such that as the plunger moves inward, it will draw the friction segments toward each other and inward away from contact with the surface 3, while the outward movement of the plungers will cause the two shoes to be forced apart and outward. By screwing the pin 28 in or out, the wear on the shoes may be taken up and the effective length of the plunger may be regulated so as to secure the most satisfactory contact of the shoes with the surface 3.

The short shaft 14 of the spider is provided with a sliding cone sleeve 31 connected to the shaft by a spline 32 so as to rotate with it. The outer surface of this sleeve is tapered as shown at 33 and 34 and is arranged to act against the rollers 25 of the plungers 22 to force them outward against the force of the springs 24 when the sleeve is forced toward the spider. The tapered portion 33 is formed at an abrupt angle so as to quickly force the plungers outward from their innermost position to take up lost motion and to bring the outer surfaces 5 of the shoes against the surface 3 of the driven member 1. The tapered portion 34 is formed on a more gradual taper so as to force the plungers outward less rapidly in proportion to its movement than the tapered portion 33, but with greater force in proportion to the force applied to move the sleeve 31. The end of the sleeve 31 opposite to that on which the taper 33 is formed is provided with an annular recess 35 adapted to receive a spring 36 which is coiled about the shaft. The other end of this spring bears against a coupling member 37 secured on the end of the shaft and provided on its end adjacent to the sleeve 31 with an annular recess 38 to receive the end of the spring. The spring 36 is of such strength as to normally hold the sleeve 31 with its tapered portion 34 in contact with the rollers 25 on the plungers 22, thus holding the shoes 4 firmly pressed against the surface 3 of the driven member 1. In order to provide for releasing the clutch, the sleeve 31 is provided with an annular groove 39 in which is received a release collar 40 formed in two parts connected by screws 41 and provided with wings 42 for connection with the releasing lever (not shown).

The coupling member 37 is provided on its outer end with a flange 43 by which it may be bolted or otherwise connected with a similar coupling member on the driving shaft (not shown) of the engine or other power device and the coupling member 37 is preferably screw-threaded on the shaft 14, as shown.

While the clutch is particularly adapted for automobiles, it obviously may be used in connection with machinery of any kind where a clutch is desired and where so used, the spring 36 may be dispensed with and the sleeve 31 be positively moved in both directions by the release collar 40.

The springs 24 serve to force the plungers inward when the tapered sleeve 31 is withdrawn by the release collar and they are made of such strength as to hold the plungers inward against the centrifugal force which tends to cause the shoes to fly out and engage the surface 3 when the engine is running.

The shoes are each preferably cast in one piece of any suitable metal and the outer surfaces 5 may be covered if desired, with any suitable material adapted to make good driving contact with the surface 3. The spider 13 is also cast in one piece with the shaft 14.

It will of course be understood that I do not desire to be limited to the form or proportion or the precise construction and arrangement shown as it is obvious that changes in form, proportion, construction and arrangement may be made without departing from the essential features of the invention as hereinafter claimed.

Having thus described my invention, what I claim is—

1. In a friction clutch the combination of a shaft carrying a spider having arms arranged in pairs, a shoe formed on the arc of a circle and movably connected to adjacent arms, the arms having slots therein arranged parallel with a line joining the middle points of the arcs of the opposite shoes, pins in the shoes received by the slots, means for holding the shoes inwardly, and means for forcing the shoes outwardly.

2. In a friction clutch the combination of a shaft carrying a spider having arms arranged in pairs, a shoe carried by adjacent arms and mounted to be capable of movement toward and from the shaft, radially movable plungers carried by the spider between the pairs of arms, links connecting the ends of the plungers and the shoes, means for holding the plungers inwardly, and means for forcing the plungers outwardly.

3. In a friction clutch the combination of a shaft carrying a spider having arms arranged in pairs, a shoe formed on the arc of a circle and movably connected to adjacent arms, the arms having slots therein arranged parallel with a line joining the middle points of the arcs of the opposite shoes, pins in the shoes received by the slots, flanges on the spider between the arms, the flanges having sockets, plungers slidably mounted in the sockets, links connecting the outer ends of the plungers and the shoes, rollers on the inner ends of the plungers, springs on the plungers interposed between the flanges and the rollers for holding the plungers inwardly, and means on the shaft for engaging the rollers to force the plungers outwardly.

4. In a friction clutch the combination of a shaft carrying a spider having arms arranged in pairs, a shoe formed on the arc of a circle and movably connected to adjacent arms, the arms having slots therein arranged parallel with a line joining the middle points of the arcs of the opposite shoes, pins in the shoes received by the slots, flanges on the spider between the arms, the flanges having sockets, plungers slidably mounted in the sockets, links connecting the outer ends of the plungers and the shoes, rollers on the inner ends of the plungers, springs on the plungers interposed between the flanges and the rollers for holding the plungers inwardly, and a slidable sleeve carried by the shaft having an abrupt tapered end and a tapered portion at a slight angle to the line of the shaft for engaging said rollers to force the plungers outwardly.

5. In a friction clutch the combination of a shaft carrying a spider having arms arranged in pairs, a shoe formed on the arc of a circle and movably connected to adjacent arms, the arms having slots therein arranged parallel with a line joining the middle points of the arcs of the opposite shoes, pins in the shoes received by the slots, flanges on the spider between the arms, the flanges having sockets, plungers slidably mounted in the sockets, links connecting the outer ends of the plungers and the shoes, rollers on the inner ends of the plungers, springs on the plungers interposed between the flanges and the rollers for holding the plungers inwardly, a sliding sleeve carried by the shaft having an abrupt tapered end and a tapered portion at a slight angle to the line of the shaft, and means on the shaft for normally holding the sleeve in engagement with said rollers.

In testimony whereof I affix my signature in presence of two witnesses.

MERVIN KESSLER.

Witnesses:
RAY ADAMS,
FRED L. CARTER.

Copies of this patent may be obtained for five cents each, by addressing the "Commissioner of Patents, Washington, D. C."